May 23, 1961 G. WHITE 2,984,943
METHOD OF HEATING AND BENDING GLASS SHEETS
Filed Feb. 29, 1956

INVENTOR.
Gerald White
BY Nobbe & Swope
ATTORNEYS

United States Patent Office 2,984,943
Patented May 23, 1961

2,984,943
METHOD OF HEATING AND BENDING GLASS SHEETS

Gerald White, Rossford, Ohio, assignor to Libbey-Owens-Ford Glass Company, Toledo, Ohio, a corporation of Ohio Filed Feb. 29, 1956, Ser. No. 568,454

3 Claims. (Cl. 49—84)

This invention relates generally to the heating of glass sheets, and more particularly to an improved method of controlling the heating of glass sheets.

The complexly curved and bent glass shapes now being used for glazing and other purposes has made it necessary that a certain portion of the sheet to be bent be heated to a lesser temperature than other portions of the sheet so that the more highly heated portions of the sheet may be formed to relatively sharp and complex curvatures while the cooler sheet portions are being bent to a relatively less severe curvature. This has proved to be particularly the case in the manufacture of bent windshields for use in automobiles. In the so-called panoramic or hook type windshields, the opposite ends of the glass sheets used to form such a windshield have a relatively severe longitudinal curvature formed therein while the central portion of the sheet, intermediate the ends thereof, is formed to a relatively shallow longitudinal curvature. In the case of cap windshields, a longitudinal curvature similar to that in panoramic windshields is used and, in addition, a transverse curvature is formed in the central portion of the sheet and extends outwardly towards the ends thereof a limited distance.

The production of windshields of such a type by the conventional methods of bending glass sheets has proved to be extremely difficult, and in some cases virtually impossible unless the heating of pre-selected portions of the glass sheets to be bent is retarded, or the heating of other portions of the sheet is accelerated so that in effect, a temperature difference exists between those portions of the sheet requiring severe curvature and the sheet portions requiring moderate curvature.

It is therefore an important object of the present invention to provide an improved method of controlling the heating of glass sheets.

Another object of the invention is to provide an improved method of retarding the heating of selected portions of a glass sheet prior to the bending thereof to a predetermined curvature.

Another object of the invention is to provide an improved method of controlling the heating of a glass sheet conveyed through a furnace wherein a fluid medium is used to absorb atmospheric furnace heat adjacent selected portions of the heated sheet.

Other objects and advantages of the invention will become more apparent during the course of the following description when taken in connection with the accompanying drawings.

In the drawings, wherein like numerals are employed to designate like parts throughout the same:

Briefly stated, the present invention comprises a method of controlling the heating of glass sheets in which a glass sheet to be bent is supported on a mold and conveyed through a furnace, and the heating of pre-selected portions of the sheet is retarded by introducing a relatively cool gas into the furnace atmosphere adjacent said sheet portions.

Figure 1:
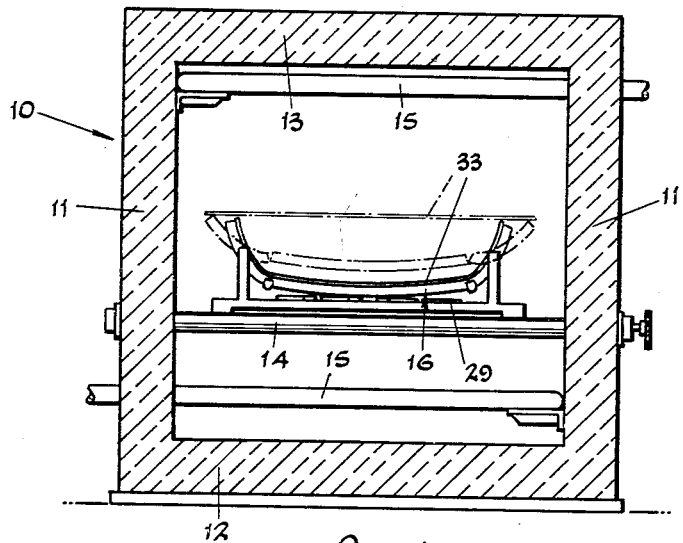
Fig. 1 is a transverse sectional view through a typical bending furnace in which glass sheets may be heated and bent in accordance with the method and apparatus of the invention.

With reference now to the drawings, and particularly to Fig. 1, there is shown in sectional view a bending furnace 10 having upstanding side walls 11, a bottom wall 12 and a roof 13. To convey bending molds supporting glass sheets through the furnace, a plurality of rotatable rolls 14 are provided upon which the supporting rack of the molds may travel.

The furnace 10 may be heated by means of radiant tubes 15 disposed both above and below the conveyor rolls 14 and adapted to direct radiant heat toward the path of the bending molds carried upon the conveyor. If desired, the radiant tubes may be eliminated and the furnace heated by a pattern of radiant burners as shown in the co-pending application Serial No. 470,424 of Gerald White and William P. Bamford, now abandoned.

Figure 2:
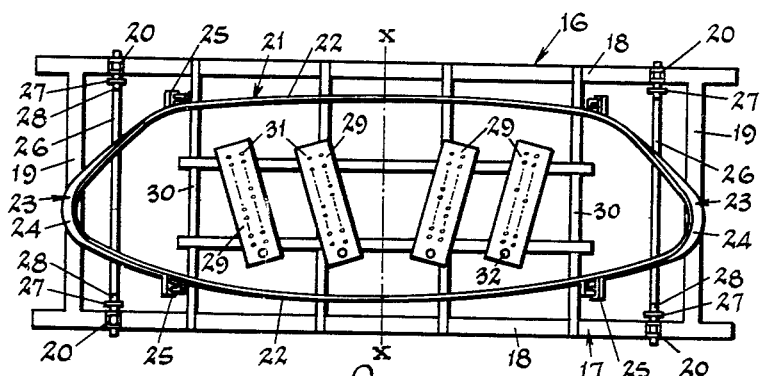
Fig. 2 is a plan view of a bending mold having associated therewith the novel gas emitting means of the invention.
Figure 3:
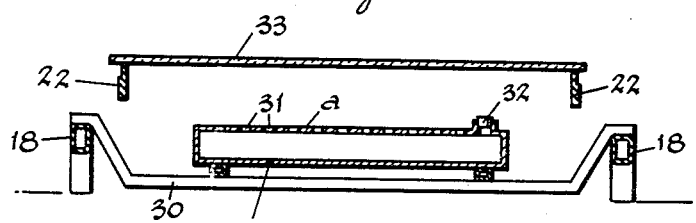
Fig. 3 is a transverse section taken along the line X—X of Fig. 2.

Although various types of bending molds may be used, the mold 16 shown in Fig. 2 may be used in performing the method of the invention. The mold 16 is supported by a substantially rectangular rack 17 comprising spaced side bars 18 joined to one another at their outermost ends by end bars 19. Extending upwardly from each of the side bars 18 adjacent the outermost ends thereof are column members 20 which support the mold 16.

The mold is of the commonly used outline type and comprises a center section 21, formed of a pair of spaced shaping rails 22, and end sections 23 formed by a shaping rail 24 which is movably joined to the center section by hinges generally designated by the numeral 25. The mold sections are supported for movement from an open position (phantom lines in Fig. 1) to a closed position (full lines in Fig. 1) by means of a transverse rod 26 secured to each of the end section rails 24 and extending outwardly therefrom to have its opposite ends rotatably received in links 27 swingably secured by pins 28 to the column members 20.

As shown in Fig. 1, the upper surfaces of the mold center section rails 22 are of a relatively shallow curvature while the opposite end section rails 24 are of a relatively sharp curvature and, together, they act to form a shaping surface for forming the glass sheet to be bent. This type of mold is of the general type commonly used in bending panoramic or hook-type windshields. In bending such windshields, it is desirable that the sharply curved portions of the bent glass sheet, which correspond roughly to the mold end sections 23, receive a relatively greater amount of heat as compared to the sheet portion corresponding to the center section 21 of the mold, so that the sheet end portions may properly conform to the more sharply curved mold end sections while the center portion of the sheet is not heated excessively which could cause undesirable sag. Therefore, it is desirable that a differential heating of the sheet be effected. Generally speaking, this differenetial hating may be effected in one of two ways: additional heat may be concentrated upon the end portions of the sheet to raise these portions to a higher temperature, or the heating of the central portion of the sheet may be retarded with respect to the end portions. It has been found preferable to retard the heating of the central portion of the sheet since by so doing, the tendency of the sheet to sag between the supported longitudinal edges thereof and thus produce an unacceptable degree of sag is eliminated because the temperature of this portion of the sheet is maintained below that at which the objectionable sag will develop.

According to the present invention, the retarding of the heating of the central portion of the glass sheet is effected by directing a relatively cool fluid in the form of a gas or vapor, such as steam, into the furnace atmosphere immediately adjacent the central portion of the sheet which fluid absorbs heat from the furnace atmosphere immediately adjacent the central portion of the sheet and thus retards the heating thereof while not materially affecting the sheet end portions.

As a means of generating this gas, a plurality of water boxes 29 are secured to the rack side bars 18, beneath the mold center section 21, by means of support rods 30. As shown in Fig. 2, the boxes 29 are arranged two each and spaced an equal distance on each side of the transverse center line $x$—$x$ of the mold and are of a length somewhat less than the distance between the side rails 22. The boxes 29 are of substantially rectangular construction, and have a plurality of small holes 31 formed in their upper surfaces $a$ and a capped opening 32 at one end thereof through which the boxes may be filled with water or other suitable vapor or gas-producing substances.

In heating and bending glass sheets in accordance with the method of the invention, the water boxes 29 are filled with water prior to passing the mold through a furnace such as furnace 10 shown in Fig. 1. Before being passed through the furnace, the mold sections are spread to the open position and a glass sheet 33 to be bent is supported thereon. While passing through the furnace, the mold is passed through successive zones of increasing temperature while the surfaces of the sheet are subjected to radiant heat until the glass sheet reaches bending temperature. In moving through the furnace, the water in the boxes 29 becomes heated to the boiling point after the mold has moved a relatively short distance along its path. After the water reaches the boiling point, the steam thus created escapes through the openings 31 in the upper surface of the water boxes. Since a certain amount of pressure is created within each of the boxes, the steam is projected upwardly toward the lower surface of the glass sheet and into the same relative portion of the furnace atmosphere during the mold's movement therethrough and retards the heating of an area of the sheet roughly corresponding to the area of distribution of the water boxes therebeneath; that is, the central portion of the sheet.

The effect of the steam on the glass sheet is believed to be two-fold; first, the temperature of the steam is necessarily somewhat less that that of the furnace atmosphere and thus absorbs heat from the atmosphere adjacent the undersurface of the sheet which otherwise would be available to heat the sheet to a higher temperature. Second, the steam when first emitted from the boxes creates a vapor barrier which may restrict the transmission of radiant heat emitted from the furnace bottom wall 12, or heating means disposed beneath the path of travel of the sheet, to the undersurface of the sheet.

The length of time during which the steam barrier is active depends, of course, upon the time required to pass the mold through the furnace as compared to the amount of water contained within the water boxes. Ordinarily, it is only necessary that the vapor barrier be active up to a point in the furnace prior to that at which the sheet sags into conformity with the mold shaping rails and the mold closes. If it is desired that the steam barrier affect the undersurface of the glass sheet after the sheet has conformed to the mold shaping surface, as for example, to further counteract any tendency of the sheet to transversely bend, a greater amount of water may be used in the water boxes or ingredients added to the water which raise the boiling point thereof so that the water will not boil until the mold has passed a greater distance into the furnace.

Although the method of the invention has been described as used when retarding the heating of only the central portion of a glass sheet to be bent, the heating of any portion of a sheet may be retarded by locating the water boxes beneath that portion or by otherwise directing the steam produced in the boxes against the selected sheet portions. For example, if it is desired to produce a transverse sag or bend in the sheet between the mold rails 22, a steam box may be placed adjacent one of the rails and thus influence the amount of heat received by the adjacent sheet portion and thus control the amount of transverse bend or determine the point of maximum bending.

It will be understood that the form of the invention herewith shown and described is to be taken as a preferred embodiment of the same, and various changes may be resorted to without departing from the spirit of the invention or the scope of the subjoined claims.

I claim:

1. In a method of heating and bending a glass sheet to a predetermined curvature, wherein the sheet to be bent is supported substantially horizontally on a bending mold having an outline shaping surface and passed through a furnace wherein the sheet is heated to bending temperature and caused to sag into conformity with the shaping surface of the mold, the improvement which comprises introducing a gaseous cooling medium into the furnace atmosphere beneath and adjacent the glass sheet and wihtin the confines of the mold shaping surface to absorb heat from the furnace atmosphere and to effect the retarding of the heating of a selected portion of the glass sheet, and maintaining the same relative position between the gaseous cooling medium and the selected portion of the glass sheet during the bending of the glass sheet.

2. In a method of heating and bending a glass sheet as defined in claim 1, wherein the gaseous cooling medium is steam and creates a barrier to restrict the transmission of heat to a selected portion of the undersurface of the glass sheet from heating means disposed beneath the path of travel of said sheet through the furnace.

3. In a method of heating and bending a glass sheet as defined in claim 2, wherein the steam barrier is created prior to the contact of the glass sheet with the mold shaping surface and is continued after the bent glass sheet contacts said mold shaping surface.

References Cited in the file of this patent

UNITED STATES PATENTS

| | | |
|---|---|---|
| 1,928,254 | Henze | Sept. 26, 1933 |
| 1,999,558 | Black | Apr. 30, 1935 |
| 2,133,783 | Merrill | Oct. 18, 1938 |
| 2,194,760 | Long | Mar. 26, 1940 |
| 2,248,714 | Lytle | July 8, 1941 |
| 2,297,314 | Offen | Sept. 29, 1942 |
| 2,443,674 | Baker | June 22, 1948 |
| 2,448,514 | Butler | Sept. 7, 1948 |
| 2,646,647 | Bamford et al. | July 28, 1953 |
| 2,674,067 | Reggiani | Apr. 6, 1954 |
| 2,683,334 | Rugg et al. | July 13, 1954 |
| 2,720,729 | Rugg | Oct. 18, 1955 |
| 2,766,555 | Jerdrisak et al. | Oct. 16, 1956 |
| 2,817,928 | Lambert et al. | Dec. 31, 1957 |